United States Patent [19]

Sakon

[11] Patent Number: 5,327,713
[45] Date of Patent: Jul. 12, 1994

[54] TIRE CORD AND TIRE

[75] Inventor: Yutaka Sakon, Akashi, Japan

[73] Assignee: Sumitomo Rubber Industries, Ltd., Hyogo, Japan

[21] Appl. No.: 26,596

[22] Filed: Mar. 5, 1993

[30] Foreign Application Priority Data

Mar. 9, 1992 [JP] Japan .................. 4-086496

[51] Int. Cl.$^5$ .................................. D07B 1/06
[52] U.S. Cl. .......................... 57/213; 57/902
[58] Field of Search ............. 57/212, 213, 217, 223, 57/902; 152/451

[56] References Cited

U.S. PATENT DOCUMENTS

| | | | |
|---|---|---|---|
| 3,015,205 | 1/1962 | Massot et al. | 57/217 |
| 4,572,264 | 2/1986 | Umezawa et al. | 57/213 X |
| 4,783,955 | 11/1988 | Uchio | 57/213 |
| 4,986,327 | 1/1991 | Takahira | 152/451 X |

FOREIGN PATENT DOCUMENTS

| | | | |
|---|---|---|---|
| 0399795 | 11/1990 | European Pat. Off. | |
| 497612 | 8/1992 | European Pat. Off. | 152/451 |
| 2476548 | 8/1981 | France . | |
| 2487866 | 2/1982 | France . | |
| 41339 | 2/1989 | Japan | 57/902 |
| 275788 | 11/1988 | Japan | 57/212 |
| 2203392 | 10/1988 | United Kingdom . | |
| 91/04370 | 4/1991 | World Int. Prop. O. | |

OTHER PUBLICATIONS

Patent Abstracts of Japan, vol. 9, No. 164 (M-395) (1887) Jul. 10, 1985 & JP-A-60 038 208.

*Primary Examiner*—Joseph J. Hail, III
*Attorney, Agent, or Firm*—Birch, Stewart, Kolasch & Birch

[57] ABSTRACT

A tire cord and a tire, wherein the tire cord comprises three inner steel monofilaments (FC) having a smaller diameter (dc) and seven outer steel monofilaments (FB) having a larger diameter (db), both the diameters (dc) and (db) being in the range of 0.15 to 0.28 mm, the inner and outer steel monofilaments being twisted in the same direction but at different pitches, and an average gap of at least 0.03 mm is provided between the adjacent outer steel monofilaments. The tire is provided with the cords as reinforcements, e.g. carcass cords, belt cords and the like.

2 Claims, 3 Drawing Sheets

TIRE CORD AND TIRE

The present invention relates to a cord for used as reinforcements of a tire, e.g. carcass cords, belt cords and the like, and a tire including the cords.

DESCRIPTION OF THE BACKGROUND ART

In tires for trucks and buses and tires for commercial vehicles, in particular as the tread reinforcements thereof, steel cords having a 1×12 structure shown in FIG. 6, a 3+6 structure shown in FIG. 5 or a 3+9 structure shown in FIG. 4 are usually used.

In the 3+6 structure, three inner filaments (FC) are twisted in a direction, and six outer filaments (FB) are twisted in the reverse direction to the twisting direction of the three inner filaments (FC). That is, if the outer filaments (FB) are in S-direction, the inner filaments (FC) are in Z-direction, or vice versa.

In the 1×12 structure, however, penetration of its topping rubber into the cord is less, and a separation failure from the rubber is liable to occur.

In the 3+9 structure, also penetration of its topping rubber into the cord is less, and the adhesion of the cord with the rubber is poor.

In the 3+6 structure, if a strength required under heavy duty use is provided, the cord diameter inevitably increases, and the tire weight is also inevitably increased.

Further, in the 3+9 structure and 3+6 structure, when the steel cord is used as pull-resistant members, e.g. belt cords and the tire is subjected to a severe service condition, such as a high pressure, heavy load and high speed, the steel filaments are liable to be fretted, and the cord is finally broken.

SUMMARY OF THE INVENTION

It is therefore, an object of the present invention to provide a light tire cord, which is improved in penetration of its topping rubber, and in which the filaments are prevented from being fretted.

It is another object of the present invention to provide a tire which is provided with such improved cords as its reinforcements, e.g. belt cords, carcass cords and the like.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the present invention will now be described in detail in conjunction with the accompanying drawings which are given by way of illustration only, and thus are not limitative of the present invention, and wherein.

DETAILED DESCRIPTION OF THE PREFERRED EMBODIMENTS

Figure 1:
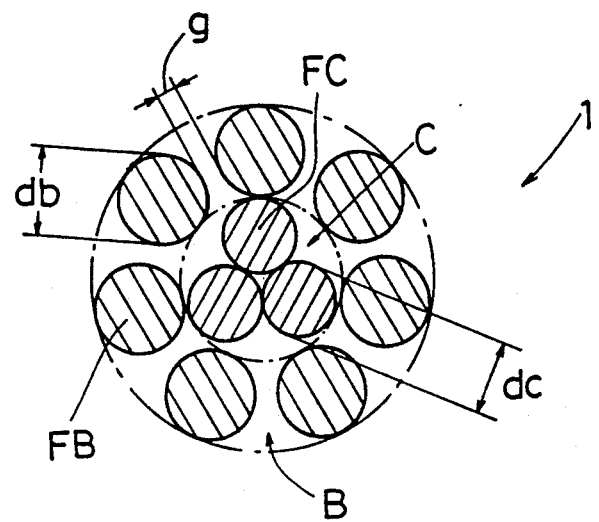
FIG. 1 is a cross sectional view of a cord according to the present invention.

In FIG. 1, a steel cord 1 comprises three inner steel monofilaments FC defining a central core C and seven outer steel monofilaments FB defining a sheath B around the core C.

The inner and outer monofilaments FC and FB are made of a carbon steel whose carbon content is 0.67 to 0.75% and formed by wire drawing.

The diameter dc of the inner monofilaments FC and the diameter db of the outer monofilaments FB are in the range of 0.15 to 0.28 mm. If the diameter is less than 0.15 mm, the cord strength decreases. If the diameter is more than 0.28 mm, the rigidity of the ply made of such a cord becomes large, and the workability becomes poor, and further the durability against repeated bending deformation decreases.

The diameter db of the outer monofilaments FB is larger than the diameter dc of the inner monofilaments FC, whereby the percentage of the total cross section area of the inner and outer monofilaments to the apparent cross sectional area of the cord increases and the cord strength increases. Therefore, the diameter of the cord can be decreased to decrease the thickness of the ply and thereby to decrease the cord weight.

The three inner monofilaments FC are twisted together in a direction. The seven outer monofilaments FB are twisted around the inner monofilaments FC in the same direction as the twisting direction of the inner monofilaments FC. That is, when the inner monofilaments FC are in S-direction, the outer monofilaments FB are in the same S-direction (S/S), or vice versa (Z/Z). Therefore, the inner monofilaments and the outer monofilaments are prevented from being fretted each other.

The twist pitch of the inner monofilaments FC is however, differed from the twist pitch of the outer monofilaments FB. In this embodiment, the twist pitch of the inner monofilaments FC is in the range of 5.0 to 6.0 mm. The twist pitch of the outer monofilaments FB is in the range of 12.0 to 14.0 mm. The twist pitch of the outer monofilaments FB is two or more times that of the inner monofilaments FC. That is, the outer pitch is larger than the inner pitch in this embodiment. However, this relationship may be reversed.

Further, between the adjacent outer monofilaments FB, a gap (g) whose average is not less than 0.03 mm is provided, whereby the rubber penetration into the cord is improved. If the average gap is less than 0.03 mm, the penetration of the topping rubber into the inner monofilaments FC becomes insufficient, and as a result the adhesion becomes poor, and the corrosion resistance decreases.

The average gap (g) is set to be not more than 1.0 mm, preferably not more than 0.7 mm so as to provide a structural or geometrical stability for the cord.

Figure 2:
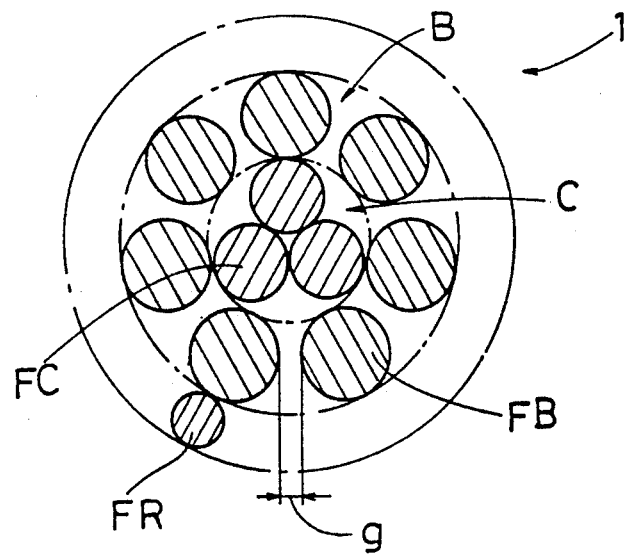
FIG. 2 is a cross sectional view of another cord according to the present invention.

FIG. 2 shows a modification of the cord 1 shown in FIG. 1, wherein at least one, in this embodiment only one wrapping filament FR is wound around the seven outer monofilaments FB in the reversed twist direction to the twisting direction of the inner and outer monofilaments. For the wrapping filament FR, steel and organic fiber materials can be used.

Figure 3:
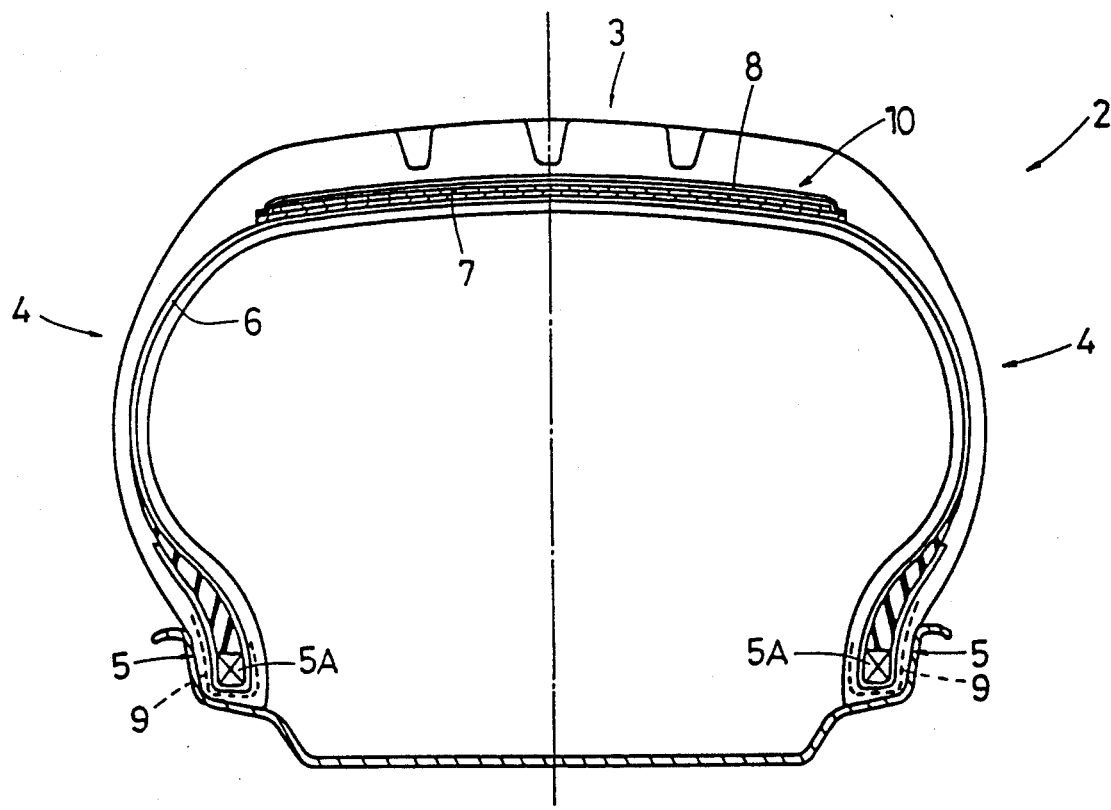
FIG. 3 is a cross sectional view of a tire according to the present invention.

FIG. 3 shows a tire 2, in which the above-explained cords 1 are used as reinforcements.

The tire 2 comprises a tread portion 3, a pair of axially spaced bead portions 5 with a bead core 5A therein, a pair of sidewall portions 4 extending between the tread edges and the bead portions, a carcass 6 extending between the bead portions 5 and turned up around the bead cores 5A, belts 7 and 8 disposed radially outside the carcass 6 and inside a rubber tread.

In this embodiment, the carcass 6 comprises one ply of the steel cords 1. The breaker belt 7 comprises two plies of the steel cords 1.

In the carcass 6 and breaker belt 7, the complex elastic modulus E* of the topping rubber for the steel cords 1 is preferably in the range of 70 to 150 kgf/sq.cm. Here, the complex elastic modulus E* is measured by a viscoelasticity spectrometer of Iwamoto Seisakusyo make under the following conditions: 10 Hz sine wave with 2% amplitude, and a temperature of 70 degrees C. If the modulus is out of the above-mentioned range, the flow of rubber during the tire vulcanization becomes insufficient.

Preferably, the cord count for the cords 1 in each ply is such that the total of the areas of the cords is not more than 80% of the whole area of the ply when viewed normally to a plane in which the cords are arranged. If the total is more than 80%, it becomes difficult to make a ply and the workability decreases.

Incidentally, in order to promote the penetration of the topping rubber, the inner pressure applied to the tire during tire vulcanization is preferably set at more than 20.0 kgf/sq.cm.

The cord 1 according to the invention can be used in a bead reinforcing layer 9 which is disposed in each bead portion 5 along the outer surface of the carcass 6.

Further, the cord 1 according to the invention is preferably used in a so called high-ply-turn-up (HPTU) structure because the ply can be decreased in thickness and weight.

Test tires of 7.50R16, 10.00R20 and 11R22.5 in size for commercial vehicle tire and truck/bus tire having the tire structure shown in FIG. 3 were made, using exemplary cords and prior art cords as carcass cords (Table 1), breaker belt cords (Table 2) and bead reinforcing layer cords (Table 3). Then, the following tests were made. The test results are shown in Table 1, Table 2 and Table 3.

A) Air transmission

The cord was took out from the tire together with its surrounding topping rubber, and the cord was cut into a length of 60 mm. Then, the volume of the air which was flowed out from one end of the cord for one minute when the other end was applied to air of 2 kgf/sq.cm pressure, was measured. The results are indicated by an index based on that Ref.1 (carcass), Ref.11 (belt) and Ref.21 (bead reinforcing layer) are 100. The smaller the value, the better the rubber penetration.

B) Corrosion Resistance

After the initial tread life was lost, five cords were took out from the tire at different axial positions, and the cords were inspected for corrosion at intervals of 2 to 4 cm. The corrosion, if existed, was evaluated into ten ranks, and the results are indicated by an index based on that Ref.1, Ref.11 and Ref.21 are 100. The larger the index, the larger the corrosion. Here, the initial tread life is such a state that the depth of a main circumferential groove decreases to 40%.

C) Fretting

At the same time and in the same way as the corrosion resistance test, the cord was inspected for fretting. The fretting, if existed, was evaluated into ten ranks, and the results are indicated by an index based on that Ref.1, Ref.11 and Ref.21 are 100. The larger the index, the larger the damage.

As explained above, in the tire cord according to the present invention, the penetration of topping rubber is improved, and the filaments are prevented from being fretted each other. Further, the cord diameter can be reduced. Therefore, the cord, when used as tire reinforcements such as carcass cords, belt cords, bead reinforcing cords and the like, can improve the tire durability and reduce the tire weight.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

Figure 4:
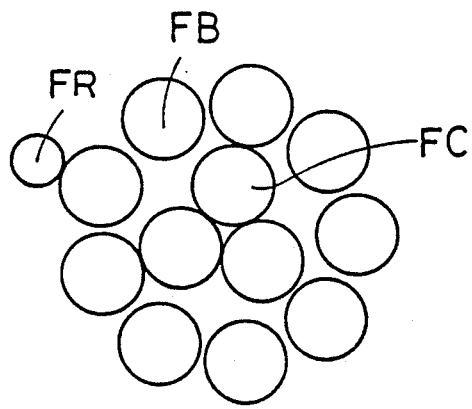
FIGS. 4, 5 and 6 are cross sectional views each showing a steel cord of a prior art.
Figure 6:
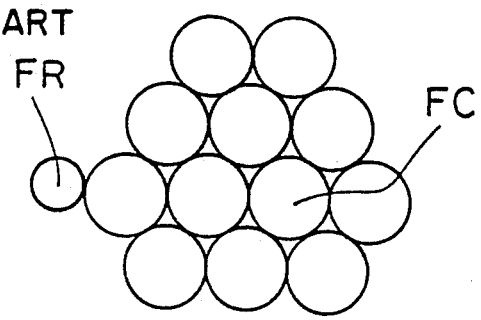

| | Carcass cord | | | | |
|---|---|---|---|---|---|
| Tire | Ex. 1 | Ex. 2 | Ex. 3 | Ref. 1 | Ref. 2 |
| Size | 11R22.5 | 750R16 | 10.00R20 | 225/90R17.5 | 11R22.5 |
| Cord | 3 + 7 | 3 + 7 | 3 + 7 + 1 | 3 + 9 + 1 | 1 × 12 + 1 |
| Structure | FIG. 1 | FIG. 1 | FIG. 2 | FIG. 4 | FIG. 6 |
| Twist direction | S/S | S/S | S/S | S/S | S/Z |
| Twist pitch (mm) | 6.0/14.0 | 5.0/12.0 | 5.0/12.0/3.5 | 6.0/12.0/3.5 | 12.0/3.5 |
| Filament dia. (mm) | | | | | |
| Inner | 0.20 | 0.17 | 0.17 | 0.22 | 0.22 |
| Outer | 0.23 | 0.20 | 0.20 | 0.22 | 0.22 |
| Wrapping | — | — | 0.15 | 0.15 | 0.15 |
| Cord weight (g/m) | 3.1 | 2.3 | 2.5 | 3.8 | 3.8 |
| Test Results | | | | | |
| Air transmission | 0.5 | 0.3 | 0.3 | 100 | 20 |
| Corrosion | 40 | 35 | 35 | 100 | 65 |
| Fretting | 100 | 88 | 113 | 100 | 125 |

TABLE 2

Figure 5:
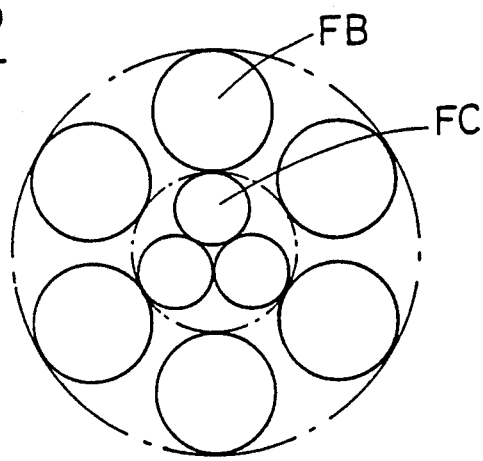

| | Belt cord | | |
|---|---|---|---|
| Tire | Ex. 11 | Ex. 12 | Ref. 11 |
| Size | 11R22.5 | 7.50R16 | 10.00R20 |
| Cord | 3 + 7 | 3 + 7 | 3 + 6 |
| Structure | FIG. 1 | FIG. 1 | FIG. 5 |
| Twist direction | S/S | S/S | S/S |
| Twist pitch (mm) | 6.0/14.0 | 5.0/12.0 | 9.5/17.5 |
| Filament dia. (mm) | | | |
| Inner | 0.20 | 0.17 | 0.20 |
| Outer | 0.23 | 0.20 | 0.35 |
| Cord weight (g/m) | 3.1 | 2.3 | 5.3 |
| Test Results | | | |
| Air transmission | 50 | 25 | 100 |
| Corrosion resistance | 85 | 65 | 100 |
| Fretting | 35 | 40 | 100 |

TABLE 3

| | Bead reinforcing cord | | |
|---|---|---|---|
| Tire | Ex. 21 | Ex. 22 | Ref. 21 |
| Size | 11R22.5 | 10.00R20 | 10.00R20 |
| Cord | 3 + 7 | 3 + 7 + 1 | 1 × 12 + 1 |
| Structure | FIG. 1 | FIG. 2 | FIG. 6 |
| Twist direction | S/S | S/S/Z | S/S |
| Twist pitch (mm) | 6.0/14.0 | 5.0/12.0/3.5 | 12.0/3.5 |
| Filament dia. (mm) | | | |
| Inner | 0.20 | 0.17 | 0.22 |
| Outer | 0.23 | 0.20 | 0.22 |
| Wrapping | — | 0.15 | 0.15 |
| Cord weight (g/m) | 3.1 | 2.5 | 3.8 |
| Test Results | | | |
| Air transmission | 5 | 3 | 100 |
| Corrosion resistance | 55 | 50 | 100 |
| Fretting | 70 | 80 | 100 |

I claim:

1. A tire cord comprising three inner steel monofilaments having a first diameter (dc) and being twisted together to form a core, and seven outer steel monofilaments having a second diameter (db) and being twisted around the core, the direction of the twist of the inner steel monofilaments being the same as that of the outer steel monofilaments, the pitch of the twist of the inner steel monofilaments being different from that of the outer steel monofilaments, said second diameter (db) being larger than said first diameter (dc), said first diameter (dc) and said second diameter (db) being in the range of 0.15 to 0.28 mm, the adjacent outer steel monofilaments being provided therebetween with a gap whose average is at least 0.03 mm.

2. The tire cord according to claim 1, which further comprises at least one outermost monofilament being wound around the twisted seven outer monofilaments.

* * * * *